US008504270B2

(12) United States Patent
Busch

(10) Patent No.: US 8,504,270 B2
(45) Date of Patent: Aug. 6, 2013

(54) TRAFFIC BROADCAST SYSTEM

(75) Inventor: Alexander Busch, München (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 178 days.

(21) Appl. No.: 13/028,645

(22) Filed: Feb. 16, 2011

(65) Prior Publication Data

US 2012/0209487 A1 Aug. 16, 2012

(51) Int. Cl.

| | |
|---|---|
| ***G06F 7/70*** | (2006.01) |
| ***G06F 19/00*** | (2011.01) |
| ***G06G 7/00*** | (2006.01) |
| ***G06G 7/76*** | (2006.01) |
| ***G08G 1/00*** | (2006.01) |

(52) U.S. Cl.

USPC .............. 701/70; 701/117; 701/118; 701/119

(58) Field of Classification Search

USPC ............... 701/70, 1, 116, 117, 118; 340/901, 340/905, 907, 909, 929, 932

See application file for complete search history.

(56) References Cited

U.S. PATENT DOCUMENTS

| | | | | |
|---|---|---|---|---|
| 3,509,525 | A * | 4/1970 | Levine et al. | 340/932 |
| 5,182,555 | A * | 1/1993 | Sumner | 340/905 |
| 5,745,865 | A | 4/1998 | Rostoker et al. | |
| 6,166,658 | A * | 12/2000 | Testa | 701/93 |
| 6,396,417 | B2 * | 5/2002 | Lee | 340/904 |
| 6,516,273 | B1 * | 2/2003 | Pierowicz et al. | 701/301 |
| 6,728,623 | B2 * | 4/2004 | Takenaga et al. | 701/96 |
| 6,931,320 | B2 | 8/2005 | Mori et al. | |
| 6,985,073 | B1 * | 1/2006 | Doan | 340/425.5 |
| 6,989,766 | B2 * | 1/2006 | Mese et al. | 340/907 |
| 7,167,106 | B2 | 1/2007 | Haase | |
| 7,466,227 | B2 * | 12/2008 | Chen et al. | 340/539.13 |
| 7,734,275 | B2 * | 6/2010 | Kubota et al. | 455/344 |
| 8,031,062 | B2 * | 10/2011 | Smith | 340/438 |
| 8,040,252 | B2 * | 10/2011 | Namikawa | 340/901 |
| 8,184,861 | B2 * | 5/2012 | Nakamura et al. | 382/104 |
| 2003/0125846 | A1 * | 7/2003 | Yu et al. | 701/1 |
| 2007/0010944 | A1 * | 1/2007 | Ferrebee et al. | 701/301 |
| 2007/0213924 | A1 | 9/2007 | Nagase et al. | |
| 2009/0115632 | A1 * | 5/2009 | Park | 340/905 |
| 2010/0007523 | A1 * | 1/2010 | Hatav | 340/901 |
| 2010/0060483 | A1 * | 3/2010 | McNew et al. | 340/907 |
| 2011/0187547 | A1 * | 8/2011 | Kweon | 340/670 |
| 2011/0246051 | A1 * | 10/2011 | Vang et al. | 701/117 |

* cited by examiner

*Primary Examiner* — Khoi Tran
*Assistant Examiner* — Nicholas Kiswanto
(74) *Attorney, Agent, or Firm* — Barley Snyder

(57) ABSTRACT

A traffic broadcast system includes a traffic broadcast module, a traffic receiver module, and a display module. The traffic broadcast module includes a traffic database module for gathering traffic data and an electronic device capable of transmitting broadcast signals of the traffic data across a broadcast area. The vehicle having a traffic receiver module that receives and analyzes broadcast signals having traffic data relevant to the vehicle with respect to the vehicle's position and direction. The display module having a key for a speedometer that informs a user of the vehicle a speed range to maintain a right of way through a next upcoming light.

15 Claims, 7 Drawing Sheets

TRAFFIC BROADCAST SYSTEM

FIELD OF THE INVENTION

The invention relates to a traffic broadcast system that broadcasts traffic data to incoming vehicles for predictive travel decisions.

BACKGROUND

Right now, the mostly discussed way of sending any kind of Car-to-Infrastructure or Car-to-Car data out is a WiFi like standard Dedicated Short Range Communication (DSRC). Sending infrastructure data out over a cell phone network can be done today, but only by using unicast person-to-person (P2P) connections.

Predictive traffic light data is of interest to a larger group of vehicles within a certain geographic area. Per definition, broadcast is the technology of choice if the same data has to be send to many clients (unidirectional). DSRC has a short range. Although broadcast is supported in cell phone technology, many router implementations are blocked, and cell phone networks generally only support unicast. That means the amount of traffic is being multiplied with the number of listening clients. This makes it very expensive to scale a system up, e.g. experienced today by IP-TV providers. With IPv6 multicast/broadcast shall be supported, but today servers of e.g. www.espn360.com, which offer live streams, stream it in a point2multipoint fashion.

A Radio Data System (RDS), is commonly known, as a communications protocol standard for embedding small amounts of digital information in conventional FM radio broadcasts.

There exists broadcasting of traffic reports through the Radio Data System, which is generally used by motorists, to assist with route planning, and for the avoidance of traffic congestion. A receiver is used to receive the broad cast, and can be set to pay special attention for special broadcasts. For instance, the receiver will receive the broadcast and stop a current action being performed by the receiver and either play or retune to the traffic announcement.

There also exists a Traffic Message Channel (TMC), which is a technology for delivering traffic and travel information to drivers. It is generally digitally coded using a FM-RDS system on conventional FM radio broadcasts. The TMC is also be transmitted on DAB or satellite radio, as well. The TMC allows silent delivery of dynamic information suitable for reproduction or display in the language chosen by the user and without interrupting normal audio broadcast services. This data is then generally integrated directly into a navigation system unit, and gives the driver detailed information regarding pending traffic situation. The TMC allows the driver to take alternative routes to avoid the traffic issues.

SUMMARY

Accordingly, the invention was devised in light of the problems described above, the invention relates to a traffic broadcast system that sends out signals to incoming traffic, identifying predictive traffic patterns based on vehicle location.

The traffic broadcast system includes a traffic broadcast module, a traffic receiver module, and a display module. The traffic broadcast module includes a traffic database module for gathering traffic data and an electronic device capable of transmitting broadcast signals of the traffic data across a broadcast area. The vehicle having a traffic receiver module that receives and analyzes broadcast signals having traffic data relevant to the vehicle with respect to the vehicle's position and direction. The display module having a key for a speedometer that informs a user of the vehicle a speed range to maintain a right of way through a next upcoming light.

BRIEF DESCRIPTION OF THE DRAWINGS

The invention will be explained in detail with reference to embodiments, referring to the appended drawings, in which.

DETAILED DESCRIPTION OF THE EMBODIMENT(S)

The invention will now be described in detail with reference to the figures.

The invention relates to a traffic broadcast system 1 that is used to efficiently control traffic flow of incoming vehicles in an out of traffic prone areas. This is performed by collecting and transmitting traffic data through the traffic broadcast system 1, which includes a traffic broadcast module 10 and a traffic receiver module 40. The traffic data is distributed to a dispersed audience through a digital transmission media, such as radio frequencies.

Figure 1:
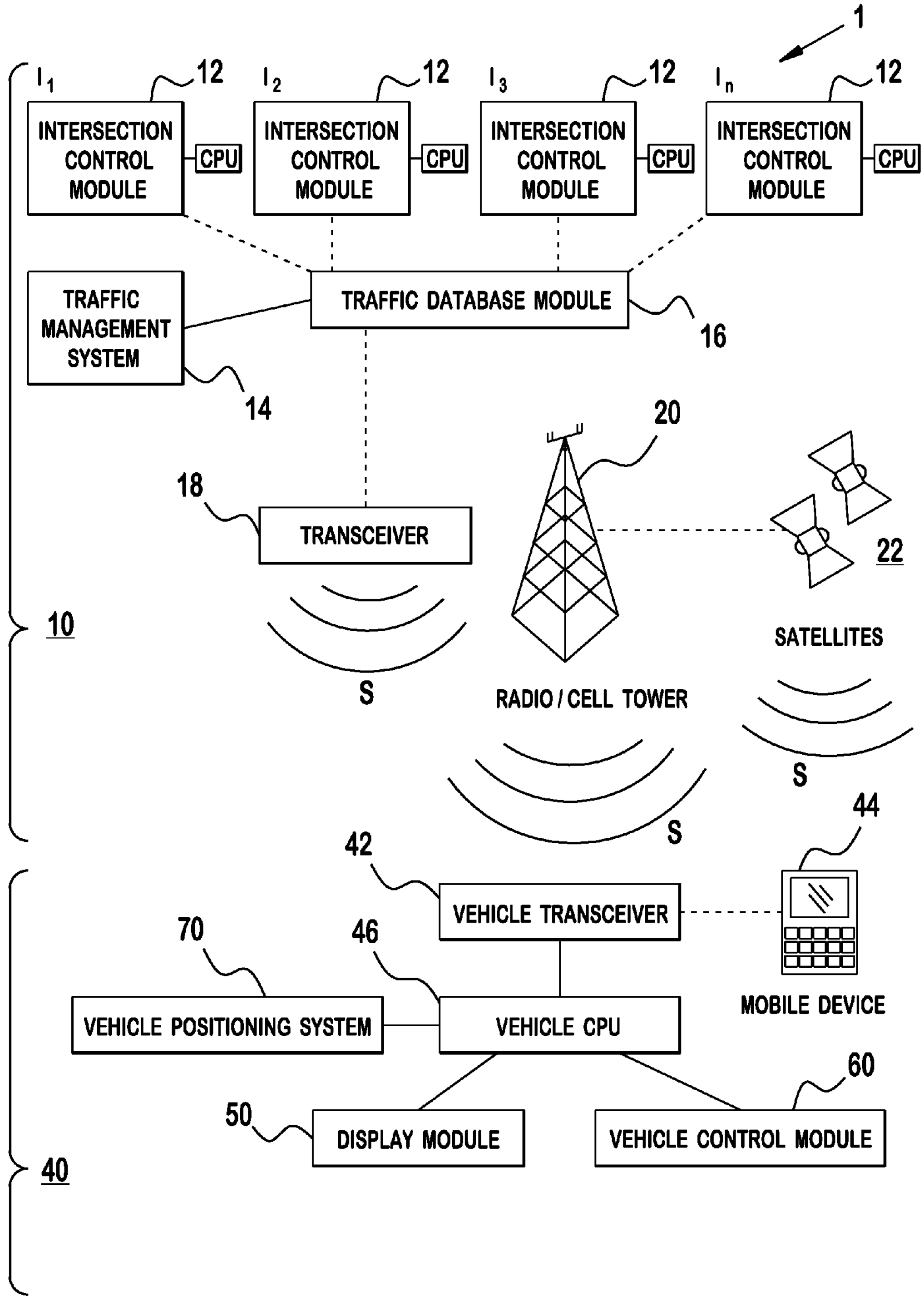
FIG. 1 is a flow diagram for a traffic broadcast system according to the invention.

The traffic broadcast system 1, as shown in FIG. 1, incorporates communication between several modules including, but not limited to, the traffic broadcast module 10 and the traffic receiver module 40.

The traffic broadcast module 10, in the embodiment shown, includes numerous components, including an intersection control module 12 (which can be any of the intersection controls modules, identified as $I_1$, $I_2$, . . . $I_N$), a traffic management system 14, a traffic database module 16, and an electronic device capable of propagating an electromagnetic signal such as radio, television, or other telecommunications in a broadcast format. In the embodiment, the electronic device capable of propagating the broadcast electromagnetic signal may be a transceiver 18, telecommunications mast or tower 20, or satellite 22. The intersection control module 12 includes an electronic circuit that can collect data and execute computer programs, such as a microprocessor.

It is possible to incorporate theses numerous components into integrated designs, such that components of the traffic broadcast module 10 can be consolidated. For instance, the intersection control module 12 may include a database, as the traffic database module 16, and a transceiver 18, or the traffic management system 14, traffic database module 16, and the electronic device capable of propagating the broadcast electromagnetic signal may be combined into a single integrated component, in a same location.

Each intersection control module 12 is positioned in and around traffic intersections, collecting traffic data, such as light schedule, number of cars passing through the intersection, etc. The intersection control module 12 includes a processor to package the data and send to the traffic database module 16, which collects data from numerous intersection control modules 12. Additional traffic information from a traffic management system 14 (i.e. the National Weather Service, Department of Transportation, third party vendor, etc.), which may include weather and traffic emergencies/issues, is also sent to the traffic database module 16. The traffic database module 16 compiles all of the information into a broadcast feed for the traffic receiver module 40. The traffic database module 16 can receive data from the intersection control module 12 or the traffic management system 14 by a variety of means, including wired and wireless transmission. As discussed previously, the traffic database module 16 and the intersection control module 12 may be an integrated unit, in some embodiments of the invention.

Since communication is the heart of the traffic broadcast system 1, it essential to establish communication between the traffic broadcast module 10 and the vehicle-processing module 46. As discussed in the background, p2p communication requires high bandwidth and expensive resources. The traffic database module 16, rather, prepares a broadcast of digital information, which is then sent by an electronic device capable of propagating an electromagnetic signal such as radio, television, or other telecommunications in a broadcast format. The traffic database module 16 sends the broadcast to the electronic device of propagating an electromagnetic signal.

In the embodiment shown, a transceiver 18, telecommunications mast or tower 20, or a satellite 22 can be used to broadcast traffic data to vehicles incoming to the broadcast area. The transceiver 18, disseminates broadcast signals S in all directions, with the broadcast signals S including information regarding upcoming traffic/intersection information such as light schedules, density, and emergency issues with the broadcast area. The broadcast signals S travel away from the transceiver 18 and encoded to be detectable to by all incoming traffic having a traffic receiver module 40. Accordingly, a telecommunications mast or tower 20 would work well, since the mast or tower allows for placement of an antenna high above the ground for larger dissemination of the broadcast signal. Hence, the broadcast area can be enhanced. Additionally, satellites 22 can also be used to disseminate broadcast signals S of traffic data over an even larger broadcast area.

According to the invention, the broadcast signals S are distributed over a broadcast area, and can be normal FM/HD radio signals, digital (sub) TV signals, or over cellular networks. For instance, in 3G long term evolution (LTE) multicast-broadcast single frequency network (MBSFN), cellular technology will make it possible to efficiently send the data to many mobiles units in adjacent cells. This technology is similar to a known 3G UMTS version, called MBMS (Multimedia Broadcast Multicast Service), which is a broadcasting service offered through existing cellular networks. The main application currently utilizing MBMS is mobile TV, where the infrastructure offers an option to use an uplink channel for interaction between the service and the user. However, MBMS is structured to use multicast distribution in the core network instead of point-to-point links for each end device. If the broadcast signal S is sent by FM HD or digital television signals having sub-channels, the broadcast signal can be received by the traffic receiver module 40 without interruption of other broadcasts that a user may be tuned to.

For broadcast signals S sent in FM HD and digital television signals, digital sub channels are used to transmit more than one independent data transmission at the same time as a digital radio or television station on the same radio frequency channel. As a result, the traffic receiver module 40 can receive the broadcast signals S along with standard radio on the same radio frequency channel, which the user does not have to switch to receive broadcast signals S. Rather, the user can still listen for a particular radio frequency channel, and the broadcast signal S will be received and processed from a sub channel in the same radio frequency channel. This is done using known data compression techniques to reduce the size of each individual program broadcast, and multiplexing to combine them into a single signal.

Still with reference to FIG. 1, the traffic receiver module 40 includes a vehicle transceiver module 42 that is capable of receiving any broadcast signals S sent from the traffic broadcast module 10. The broadcast signals S that are captured by the vehicle transceiver module 42, and then further relayed to the vehicle-processing module 46 for processing of the sent information. As a result, a connection between the traffic broadcast module 10 and the vehicle-processing module 46 is established, and a potential to communicate information is realized.

The vehicle transceiver module 42 may be designed and prepared in a variety of ways, such as an external component connecting to the vehicle-processing module 46, or an integral component of the vehicle-processing module 46. In the embodiment shown, the vehicle transceiver module 42 is designed as an external component to the vehicle-processing module 46. As such, then it is also is possible to have the vehicle transceiver module 42 placed in strategic position around the vehicle to better receive and accept incoming broadcast signals S. As a result, though, the vehicle transceiver module 42 would have to indirectly or directly connect with the vehicle-processing module 46. This connection may be established in several ways; however, it would most notably require either a direct wire connection or wireless technology. In the embodiment shown, the vehicle-processing module 46 would also include a processor to process traffic information carried by the incoming broadcast signals S, and a vehicle positioning system 70. Either of which may be an integral component by design or a separate module all together.

The vehicle positioning system 70 is used to determine the approximate position of the vehicle having the traffic receiver module 40, which may be performed by connecting to one or more vehicle tracking systems. As a result, the vehicle positioning system 70 can determine the approximate or precise location of the vehicle to which it is attached. That position is then recorded at regular intervals into the vehicle positioning system 70 or into a memory of the vehicle-processing module 46, which is either connected to the processor or the vehicle positioning system 70. Knowledge as to the location of the incoming vehicle is critical to the traffic broadcast system 1, because the traffic broadcast module 10 broadcasts information relating to any number of light schedules, traffic/weather issues, and traffic volume in a specific broad cast area, without regard to a position of any number of traffic receiver modules 40 in the broadcast area.

The vehicle positioning system 70, as described above, is any type of system that utilizes a communications component to identify the approximate or precise location of a vehicle. The vehicle positioning system 70 would only require the use of vehicle tracking system that has at least sub-10 meter accuracy. In the embodiment shown, the vehicle positioning system 70 would use a communications component, such as radio/television masts and towers 20 or satellites 22 transmitters, in order to receive with regard to specific positioning and direction traveling. This received information is then analyzed to determine the approximate or precise vehicle position with regard to information in the broadcast signals S that are relevant to that specific vehicle, heading in a certain direction and in a specific area. The position may be additionally displayed using an on-board component display module 50, i.e. having an electronic map (not shown), as is commonly known.

For instance, a Global Position Systems (GPS) 41 could be one type of vehicle tracking system used, whereby the GPS 41 utilizes satellites 22 to transmit signals that are then sent to and received by the vehicle positioning system 70 (a global positioning receiver). The vehicle positioning system 70 would first locate four or more GPS satellites 22, and then calculate the distance to each satellite 22 by analyzing information sent in signals sent from the satellites 22. This analysis, which is relatively known in the art and performed by the vehicle positioning system 70, determines the approximate, if not precise, vehicle position in real time. As an alternative, cellular technology that utilizes radio masts and towers 20, may be used as well, although not as robust. In fact, mobile positioning, using a handheld device, like a mobile device 44, is also possible, wherein the approximate position of a mobile device 44 is tracked. Since, the mobile device 44 would be in an approximate position to the vehicle, the vehicle position would also be determined. However, an additional connection between the mobile device 44 and vehicle positioning system 70 would have to be established. Bluetooth technology is one type of technology that would establish a wireless protocol for exchanging data over short distances between the vehicle positioning system 70 and the mobile device (not shown). Therefore, a personal area network (PAN) is created.

The mobile device 44 device can also be sued to receive the broadcast signals S using the cellular broadcast technology, discussed above. Again, an additional connection is performed, but now between the mobile device 44 and vehicle-processing module 46. Bluetooth technology can establish a wireless protocol for exchanging data over short distances between the vehicles the mobile device 44 and the vehicle-processing module 46, such that a personal area network (PAN) is created. If the mobile device 44 is used to receive broadcast signals S and obtain vehicle location/traveling direction.

Vehicle-processing module 46 is a processing unit for the broadcast signals S, regardless if they are received by the vehicle transceiver module 42, or mobile device 44. The vehicle-processing module 46 determines what traffic data in the broadcast signals S that are relevant to the vehicle having traffic receiver module 40. For instance, the vehicle-processing module 46 determines the direction and location of the vehicle using the vehicle positioning system 70 and decides the most likely route of the vehicle with regard to this information. Accordingly, the vehicle-processing module 46 then determines which traffic data is relevant, such as upcoming traffic light schedules, traffic emergencies, road closure, and other relevant traffic data may affect travel of the vehicle. The relevant traffic data is generally truncated traffic data from the broadcast signals S sent from the traffic broadcast module 10, and is determined relevant based on vehicle position and current direction. If the vehicle turns in direction or traffic light schedules change, the vehicle-processing module 46 will further amend what traffic data is relevant, and constantly revises what traffic data is relevant to the vehicle with regard to position and direction. Once, the vehicle-processing module 46 determines what traffic data is relevant to the vehicle having traffic receiving module 40, the vehicle-processing module 46 will then send the relevant traffic data to a display module 50 and/or vehicle control module 60. The display module 50 displays relevant traffic data to the user of the vehicle having the traffic broadcast module 10, while the vehicle control module 60 controls the movement of the vehicle, according to what the vehicle-processing module 46 determines is relevant traffic data. Both the display module 50 and vehicle control module 60 will be discussed in furtherance below.

The traffic broadcast system 1 relies on broadcast communication of traffic data, which can be transmitted through different outlets, including, but not limited to an electronic device capable of propagating the broadcast electromagnetic signal, which may be a transceiver 18, telecommunications mast or tower 20, or satellite 22.

Figure 2:
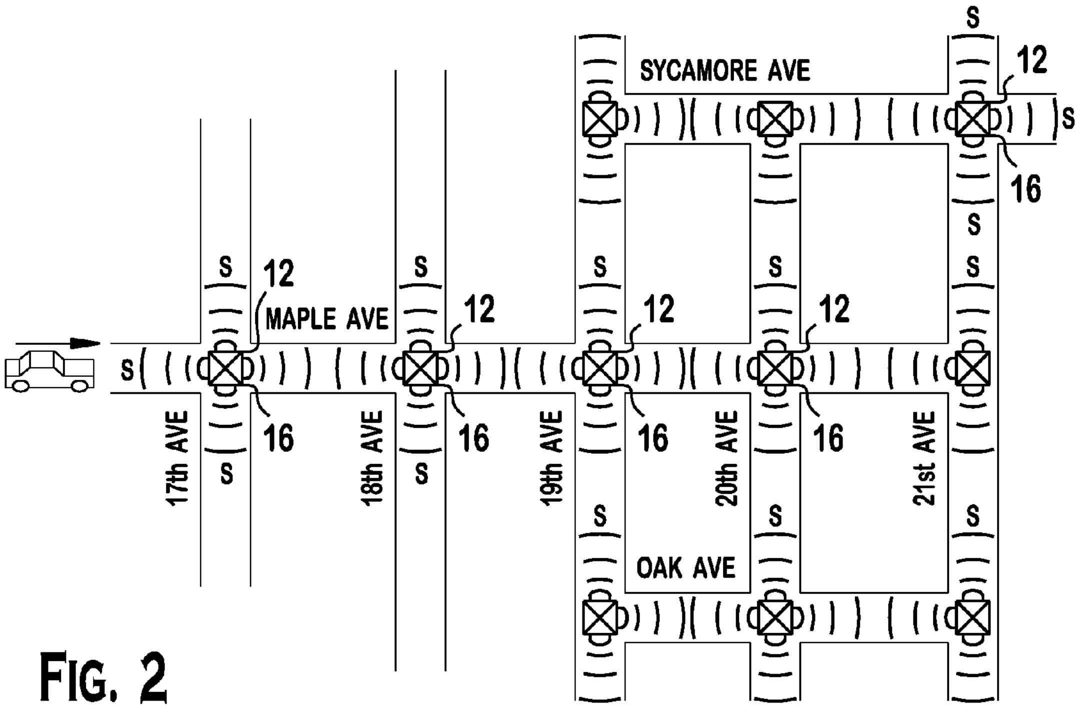
FIG. 2 is a top view of a traffic broadcast system according to the invention.
Figure 3:
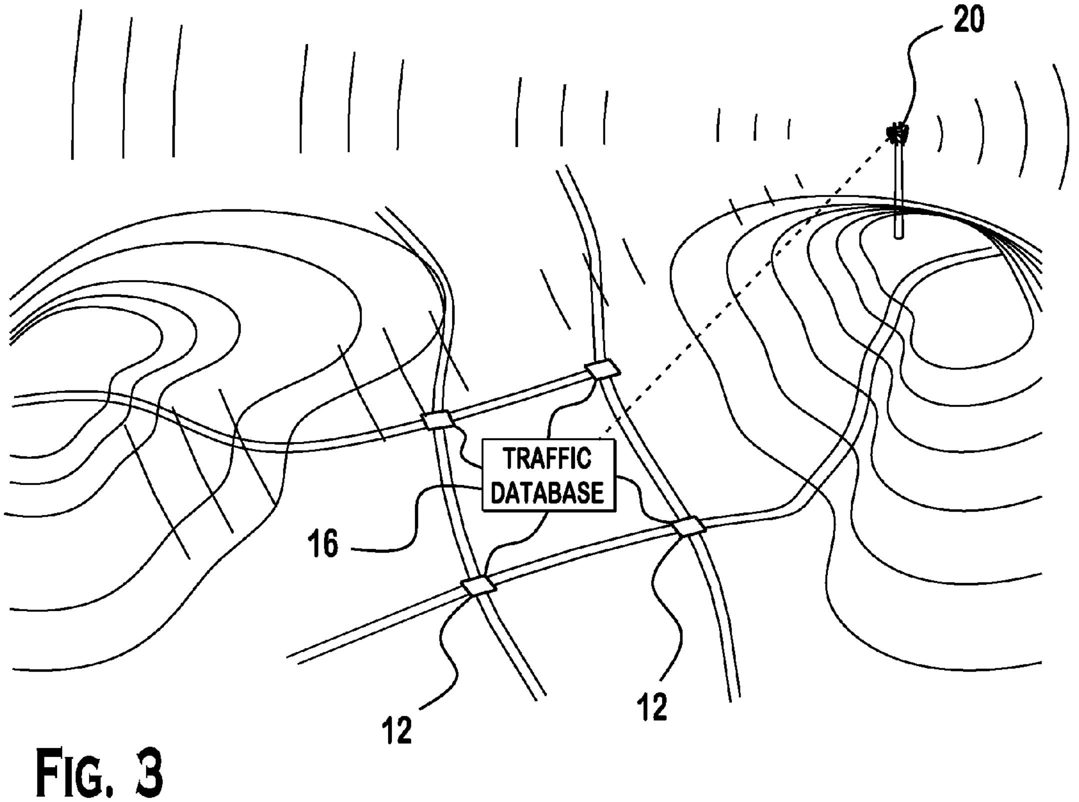
FIG. 3 is a top view of another traffic broadcast system according to the invention.
Figure 4:
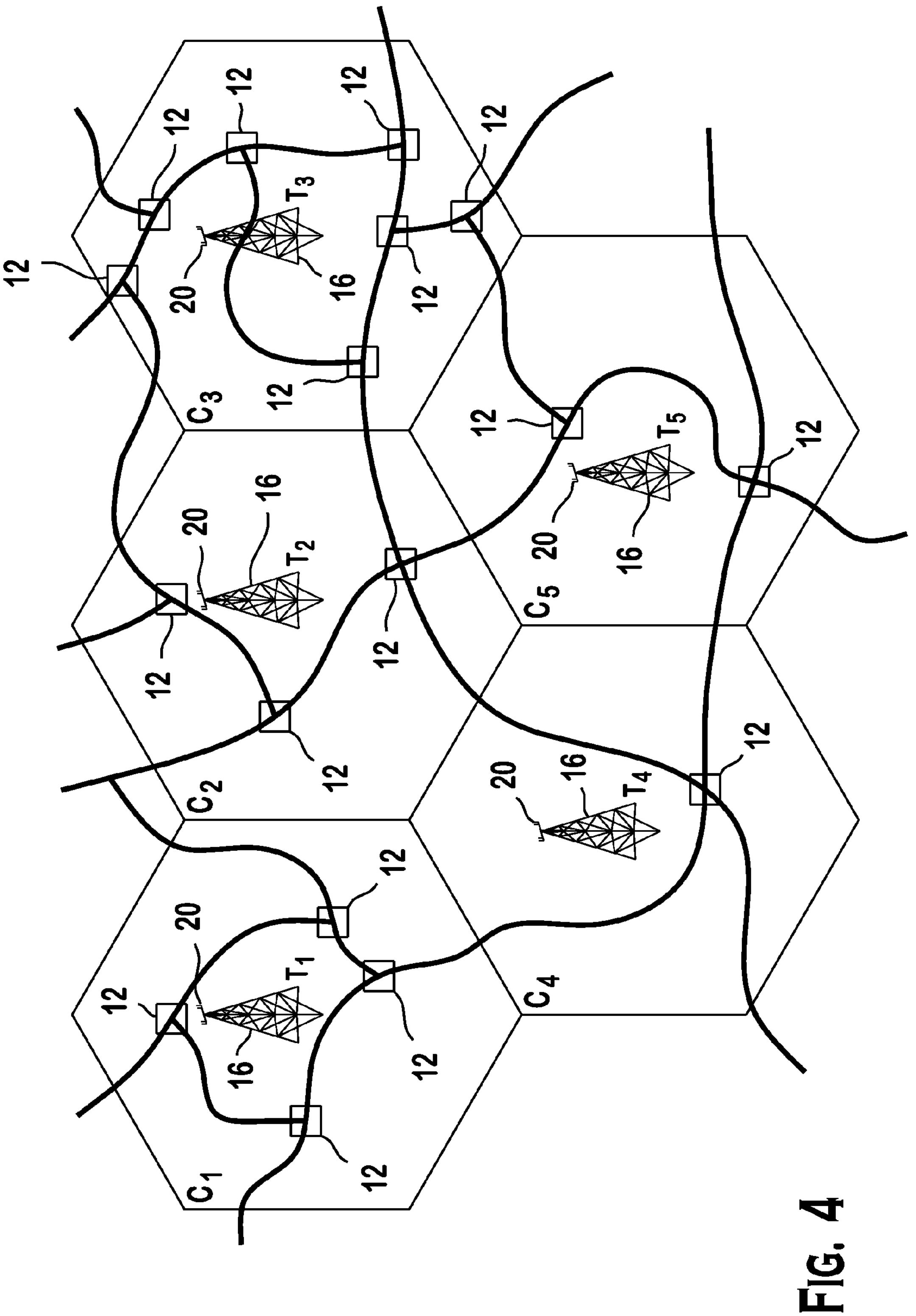
FIG. 4 is a top view of another traffic broadcast system according to the invention.

Now referring to FIGS. 2, 3, and 4, different broadcast areas are shown having a number of intersections. Each broadcast area includes different electronic devices capable of propagating broadcast signal S With regard to FIG. 2, an urban broadcast area is shown, having several intersection control modules 12 with integrated traffic database modules 16 and transceivers 18 to transmit broadcast signals S to incoming traffic. The transceivers 18 broadcast traffic data across the broadcast area, in all directions. The broadcast signals S are strong enough to travel across numerous intersections, and a vehicle having a traffic broadcast module 10 will receive those broadcast signals S.

The vehicle-processing module 46 determines what traffic data is relevant based on positioning and direction traveling, and sends the data to the display module 50 and/or vehicle control module 60.

It is also possible that a number of intersection control modules 12 are connected to each other in a broadcast area. Traffic data is collected by each intersection control module 12 and then transferred back and forth between each of the intersection control modules 12. An integrated traffic database module 16 is provided in each intersection control module 12. The integrated traffic database modules 16 compile and collect the traffic data, as well as any data from the traffic management system 14.

A vehicle having a traffic broadcast module 10 can receive broadcast signals S from any of the intersection control module 12, and receive broadcast signals S from which concerns traffic data from across the broadcast area.

Broadcast signals S, carrying information about the intersection, are sent from the intersection transceiver 18 and carry as far as the communication technology permits. Additionally, the travel of broadcast signals S can be manipulated by the transceiver, so that the broadcast signals S are sent in various directions but within a fixed range. For instance, the transceiver 18 may be pre-programmed to deliver broadcast signals 50 yards from an intersection.

However, in broadcast areas having greater distance between intersections or in varying terrain, other electronic devices capable of propagating an electromagnetic signal such as telecommunications mast or tower 20, or satellites 22 may be more efficient.

In FIG. 3, a telecommunications mast or tower 20 is used to transmit broadcast signals S across a broadcast area, which may work better in more rural areas. The intersection control modules 12 in a broadcast area connect to an integrated traffic database module 16 and an antenna atop the telecommunications mast or tower 20, in order to transmit broadcast signals S to potential incoming traffic.

It is unlikely that roadways, leading into the intersection, will always be straight paths. Rather, many of the roadways will wind and bend into the intersection. Additionally, their paths will include obstacles that may interfere with the communication between the traffic broadcast module 10 and the vehicle-processing module 46. Obstacles, such as a mountain or a tunnel, could cause interference in that communication, and could provide inefficient operation of the traffic broadcast system 1. Since this presents a potential problem for transmission and reception of the broadcast. As a result, having the traffic broadcast modules 10 connected to the telecommunications mast or tower 20 may strategically position the telecommunications mast or tower 20 to transmit broadcast signals with little interference, while maximizing the traffic broadcast system 1 efficiency.

Referring to FIG. 4, several broadcast areas are shown, and identified by a cellular network, through which broadcast signals S are sent. The cellular network is a radio network distributed over land area cells (represented as each hexagon in the embodiment shown). Each cell is served by at least one fixed-location transceiver on a telecommunications mast or tower 20. When data is connected between the cells provide, broadcast coverage over a wide geographic area is possible, which enables a large number of traffic receiving modules 40 to receive broadcast signals S concerning traffic data in the broadcast area. Exiting cellular service providers can use the traffic broadcast module 10 to send broadcast signals S to customers, using an existing mobile device 44, and support software. The broadcast signals S can then be sent to the vehicle-processing module 46 using technology that can establish a wireless protocol for exchanging data over short distances between the vehicle the mobile device 44 and the vehicle-processing module 46 (i.e. Bluetooth technology). The mobile device 44 can also used to obtain vehicle location/traveling direction information, which is also sent to the vehicle-processing module 46.

Figure 5:
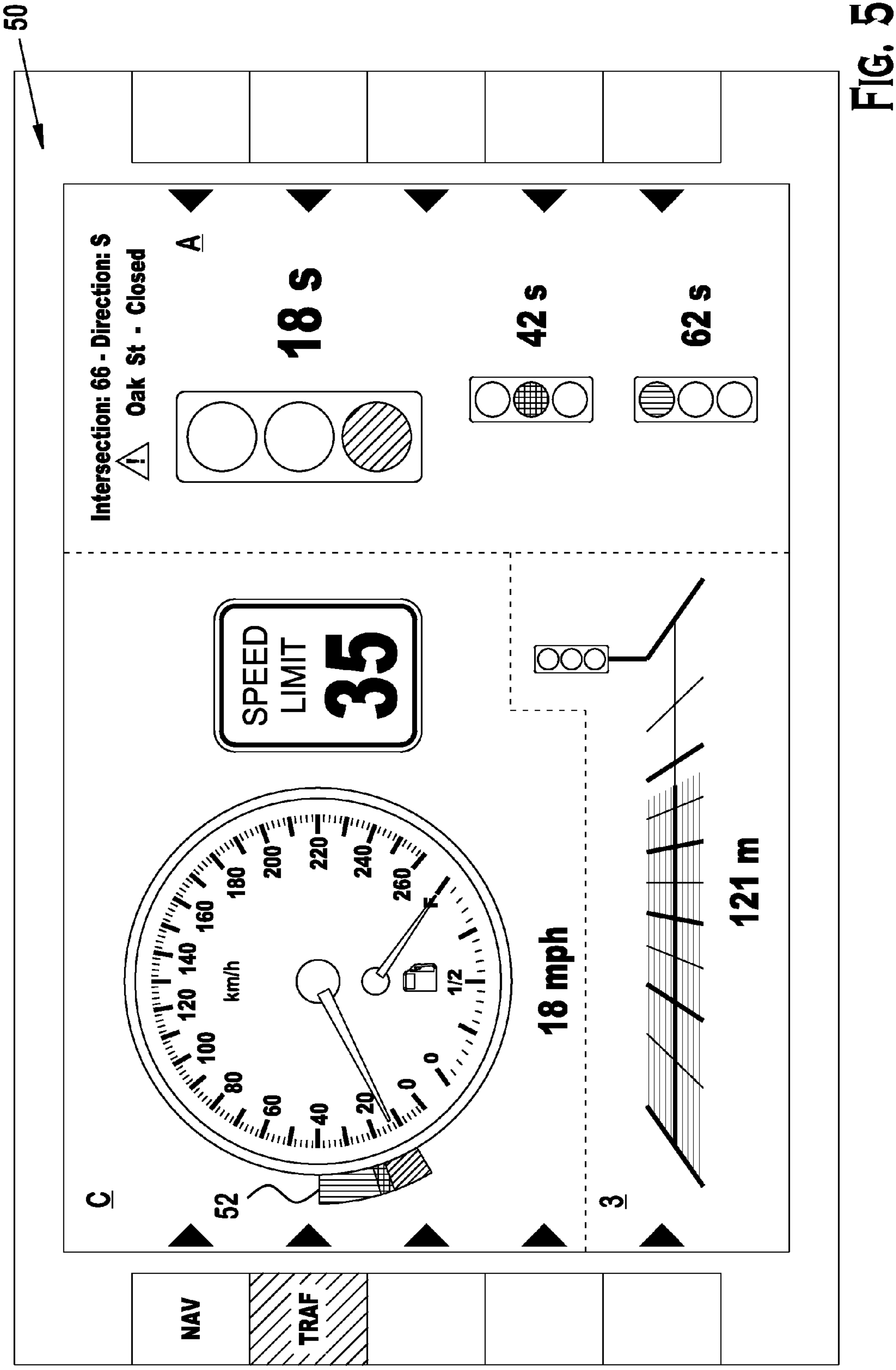
FIG. 5 is a graphical representation of a display module of a traffic receiver module according to the invention.
Figure 6:
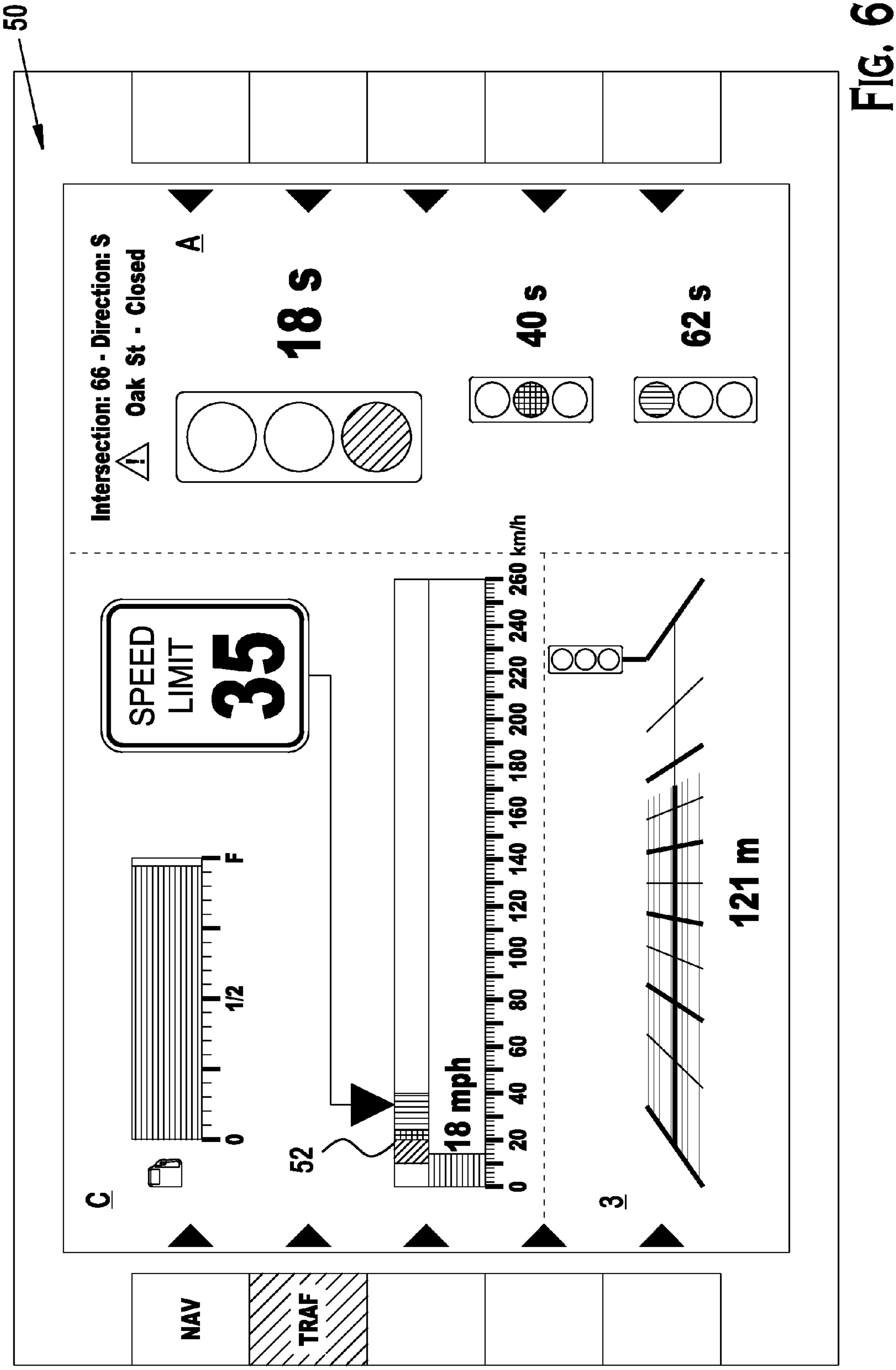
FIG. 6 is graphical representation of another display module of a traffic receiver module according to the invention.

FIG. 5 shows a display module 50 according to the invention, which illustrates traffic information, including upcoming light schedule based on current position and direction, as well as identified speeds the vehicle must maintain to receive a right of way through the upcoming lights. In the embodiment shown, the display module 50 utilizes a navigation/receiver unit in a vehicle. However, it is possible that the features of the display module be used through a vehicle dashboard display. The display module 50 provides the vehicle user information about upcoming traffic issues and/or intersection light schedules.

In the embodiment shown, the display module 50 includes several sections of traffic data, including a status section A, a distance section B, and a speed section C. The status section A includes information concerning current vehicle position and direction traveling. Based on this information, the vehicle-processing module 46 determines an upcoming light schedule according to the traffic data in the broadcast signals S. For instance, in the embodiment shown, the status of upcoming lights ($L_1$, $L_2$, . . . $L_n$) are shown, and determined by processing traffic and vehicle status data through the vehicle-processing module 46. The status section also informs the user on far the vehicle is from each upcoming light ($L_1$, $L_2$, . . . $L_n$), which can be informed using distance or time measurements. In the embodiment shown, the vehicle user is informed on how long it will take to reach each upcoming light ($L_1$, $L_2$, . . . $L_n$) based on current position and velocity. Any emergency, road closure, etc. can be provided to the vehicle user as well. The vehicle user can scan through this information, as well as any number of upcoming lights ($L_1$, $L_2$, . . . $L_n$), as the current light status is provided. For upcoming traffic lights ($L_1$, $L_2$, . . . $L_n$) that are scheduled, the status section A can also provide a time period: (1) the time each upcoming light ($L_1$, $L_2$, . . . $L_n$) will maintain a current light status (i.e. green, red, or yellow), or (2) the time each upcoming light ($L_1$, $L_2$, . . . $L_n$) will maintain a green light status or until a green light will occur.

In the distance section B, the display module 50 provides the user a distance until the next upcoming light $L_1$. As a result, the vehicle user can identify how far the vehicle is between a current position and the next upcoming light by distance and timing.

In the speed section C, a vehicle speedometer is shown having a key 52, as well as the posted speed limit issued for the road traveled. The key 52 is coded to inform the vehicle user on what speed the vehicle must maintain to reach a clear right of way through the first upcoming light $L_1$ (i.e. green light). It also provides speeds for which the vehicle would not receive a clear right of way through the light (i.e. red, yellow lights). For instance, in the embodiment shown, the key 52 shows that the vehicle user must maintain a speed of 25 mph or higher to gain a clear right of way through the first upcoming light $L_1$ (i.e. green light). If the vehicle user, maintains a speed between 20 mph and 25 mph, the vehicle user may not gain a clear right of way through the first upcoming light $L_1$ (i.e. yellow light), and will probably be stopped at the first upcoming light $L_1$ if the vehicle user maintains a speed under 20 mph (i.e. red light).

In another aspect of the invention, the vehicle-processing module 46 sends commands to the vehicle control module 60, which assists in reducing the speed of the vehicle based on current traffic information (i.e. status of upcoming traffic schedules). The vehicle control module 60 utilizes existing braking assistance or active cruise control, so that the vehicle can travel through the broadcast area and avoid any number of stoppages that are avoidable based on change in vehicle speed. If the vehicle is required to increase speed to avoid any number of stoppages, the vehicle control module 60 provides the vehicle user with an indicator, such as a light or alarm, to alarm the vehicle user and advise the vehicle user to accelerate the vehicle. If the display module 50 is also available, the vehicle user can use the key 52 to determine a proper speed in order to maintain a clear right of way through the first upcoming light $L_1$ (i.e. green light).

In another embodiment, the speedometer is replaced in the speed section C with a linear map of speed intervals, listing the current speed of the vehicle and indicates posted speed limits for the road being traveled. The key 52 is also included with the linear map, indicating the range of speeds necessary to receive or not receive a right of way through the first upcoming light $L_1$. The status and distance sections A, B would have properties consistent with the way they are described above.

Figure 7:
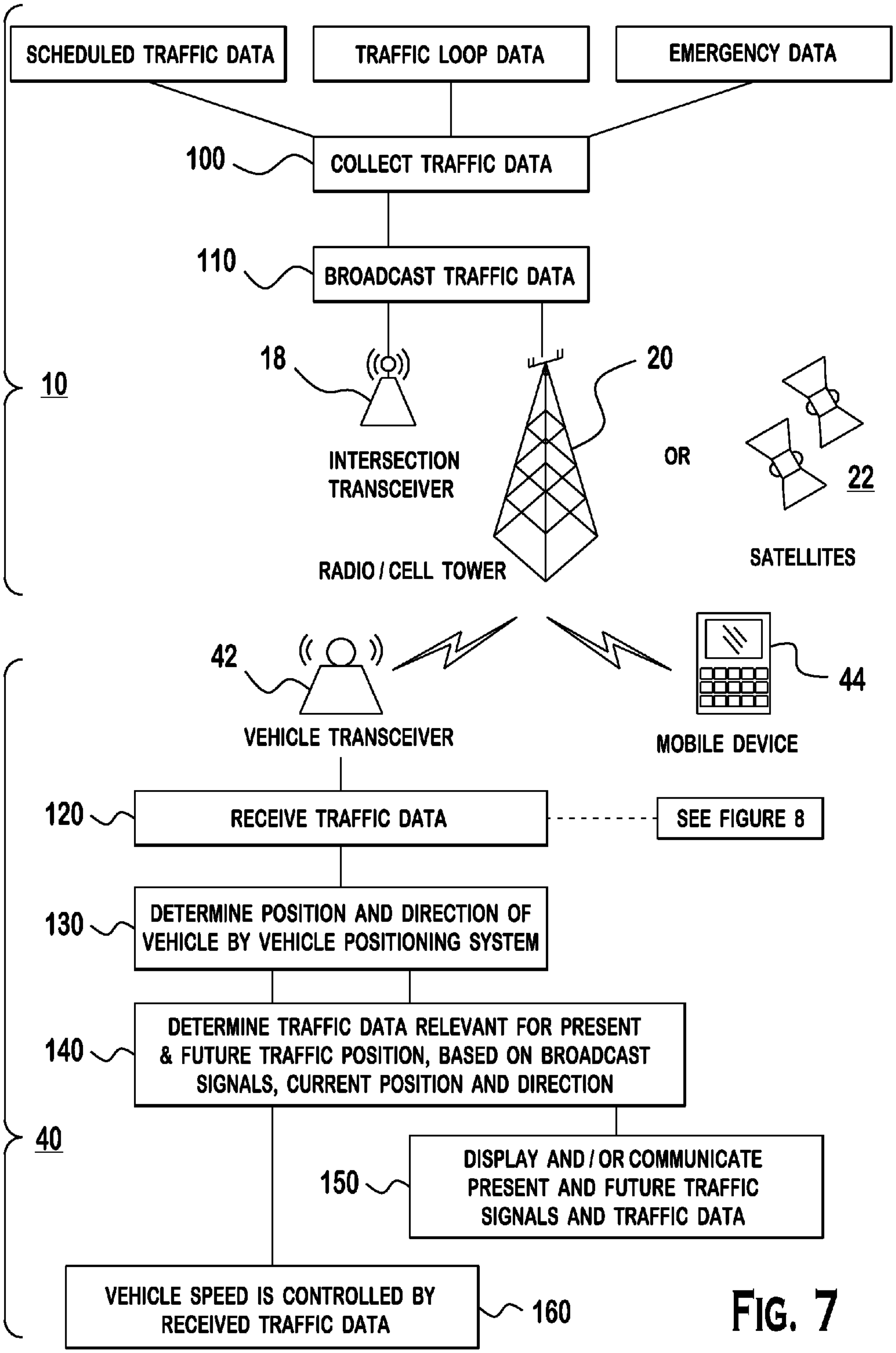
FIG. 7 is a flow diagram detailing how traffic data is collected and transmitted through the traffic broadcast system according to the invention.

With reference to FIG. 7, a basic flow diagram of the traffic broadcast system is shown. In step 100, traffic data is collected from intersection control modules 12, including scheduled traffic data and traffic loop data, as well as emergency traffic data, including, but not limited to accidents, traffic jams, and road closures. This data is continually collected and compiled, and includes metadata information, referencing time, and position, for instance.

At step 110, the traffic data is converted to broadcast signals S, which are then transmitted, in broadcast format, over a designated broadcast area. The broadcast area will range in size and shape, which will depend on strength of the transmission and broadcast area terrain, including manmade structures. As discussed above, any electronic device capable of propagating the broadcast electromagnetic signal may be used, including a localized transceiver 18, radio/cellular mast or tower 20, or satellites 22. However, different electronic devices may more efficiently transmit a broadcast signal depending on the broadcast area (i.e. urban vs. rural areas, terrain, and obstacles).

The traffic broadcast module 10 continuously sends out intersection information through broadcast signals S using the intersection transceiver 18, or other electronic devices capable of propagating an electromagnetic signal such as radio, television, or other telecommunications in a broadcast format (i.e. radio/cell mast or tower 20, satellites 22, etc.).

At step 120, the broadcast signals S are received by a traffic receiver module 40. As discussed above, the broadcast signals can be received by a vehicle transceiver module 42 or a mobile device 44, which can then relay broadcast signals S or even processed traffic data to the vehicle transceiver module 42. A wireless connection between the mobile device 44 and the vehicle transceiver module 42 can be established, such as Bluetooth technology, which would establish a wireless protocol for exchanging data over short distances between. However, a wired connection would be established between the mobile device 44 and the vehicle transceiver module 42, as well, where the mobile device 44 physically connects with the vehicle transceiver module 42 so that traffic data may be processed by the vehicle-processing module 46.

At step 130, the vehicle position and direction is determined. As discussed above, the vehicle transceiver module 42 may be designed and prepared in a variety of ways, such as an external component connecting to the vehicle-processing module 46 and/or the vehicle positioning system 70. Furthermore, each of the components may be an integral component by design or separate modules all together. Regardless if the vehicle positioning system 70 is a separate or integrated module to the vehicle-processing module 46, the vehicle positioning system 70 may be used to determine the approximate position of the vehicle having the traffic receiver module 40, which may be performed by connecting to one or more vehicle tracking systems. The vehicle positioning system 70 determines the approximate or precise location of the vehicle The vehicle positioning system 70, as described above, is any type of system that utilizes a communications component to identify the approximate or precise location of a vehicle. The vehicle positioning system 70 would only require the use of vehicle tracking system that has at least sub-10 meter accuracy. In the embodiment shown, the vehicle positioning system 70 would use a communications component, such as radio/television masts and towers 20 or satellites 22 transmitters, in order to receive with regard to specific positioning and direction traveling. A Global Position Systems (GPS) 41 could be one type of vehicle tracking system used, whereby the GPS 41 utilizes satellites 22 to transmit signals that are then sent to and received by the vehicle positioning system 70 (a global positioning receiver). The vehicle positioning system 70 would first locate four or more GPS satellites 22, and then calculate the distance to each satellite 22 by analyzing information sent in signals sent from the satellites 22. This analysis, which is relatively known in the art and performed by the vehicle positioning system 70, determines the approximate, if not precise, vehicle position in real time.

In another embodiment, cellular technology that utilizes radio masts and towers 20, may be used as well, although not as robust. In fact, mobile positioning, using a handheld device, like a mobile device 44, is also possible, wherein the approximate position of a mobile device 44 is tracked. Since, the mobile device 44 would be in an approximate position to the vehicle, the vehicle position would also be determined. However, an additional connection between the mobile device 44 and vehicle positioning system 70 would have to be established, especially if the mobile device 44 is also used to receive broadcast signals S.

At step 140, the vehicle-processing module 46 digests and processes all incoming broadcast signals S and vehicle positioning data (i.e. position, direction, and speed), and determines what traffic data is appropriate for a current and immediate future traffic conditions, including light schedules and traffic obstacles. Based on the vehicle position and direction, the vehicle-processing module 46 determines a route that vehicle is most likely to travel. If a navigation system is being utilized by the vehicle user, then the requested travel route can be incorporated into a determination of the route that vehicle is most likely to travel. Once that route is determined, then the vehicle-processing module 46 determines what traffic data is relevant for the vehicle out of the broadcast signal.

Once, the vehicle-processing module 46 determines what traffic data is relevant to the vehicle, the vehicle-processing module 46 will then send the relevant traffic data to a display module 50 and/or vehicle control module 60, at steps 150 and 160 respectively. The display module 50 displays relevant traffic data to the user of the vehicle having the traffic broadcast module 10, while the vehicle control module 60 controls the movement of the vehicle, according to what the vehicle-processing module 46 determines is relevant traffic data, as discussed above.

Figure 8:
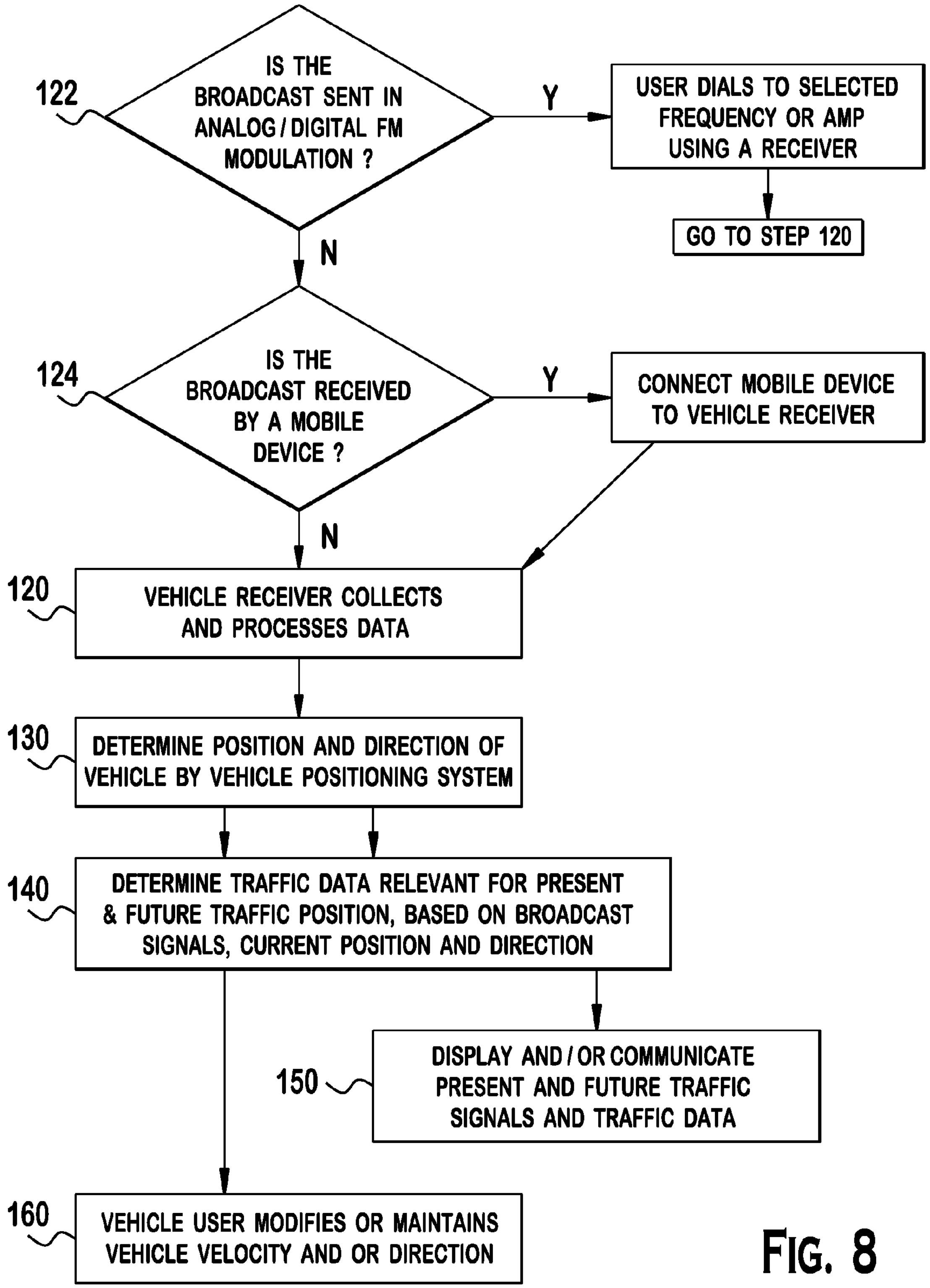
FIG. 8 is a flow diagram detailing a process on how the traffic data is received by a vehicle traffic module.

With reference to FIG. 8, a basic flow diagram is shown, illustrating generally how the broadcast signals S are received, processed, and utilized.

At step 122, the traffic receiving module 40 determines what type of broadcast signals S are being sent from the traffic broadcast module 10, which may be distinguished between analog and digital modulation, such FM HD. If the broadcast signals are in FM digital modulation, such as FM HD, then a vehicle user can dial to a selected frequency using a receiver, at step 123. As discussed above, transmitting the broadcast signal S in broadcast format is the heart of the traffic broadcast system 1. Therefore, other technology such as mobile broadband is possible as well.

At step 124, the traffic receiver module 40 receives broadcast signals S through either a vehicle transceiver module 42 or a mobile device 44, such as a mobile phone, mobile broadband card, or similar device. If the broadcast signals S are received by the mobile device 44 at step 124, then the mobile device 44 can be used in many different ways. As discussed above, the mobile device can either process and analyze the broadcast signals S at step 125, including vehicle positioning and direction, or can relay the broadcast signals S to the be processed by the vehicle-processing module 46 at step 126

The subsequent steps resume with the vehicle-processing module 46 preparing data for the display module 50 and/or the vehicle control module 60.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

What is claimed is:

1. A traffic broadcast system for broadcasting traffic information, comprising:

a traffic broadcast module having a traffic database module for gathering traffic data including upcoming traffic light schedules, traffic density, and traffic emergency issues along a predetermined path of travel and an electronic device capable of transmitting broadcast signals of the traffic data across a broadcast area;

a vehicle having a traffic receiver module that receives and analyzes broadcast signals having traffic data relevant to the vehicle with respect to the vehicle's position and direction and having a vehicle processing unit that determines an upcoming light schedule for the next upcoming light and subsequent lights on the predetermined path of travel according to the traffic data sent in the broadcast signals; and a display module having a key indicating for a speedometer that informs a user of the vehicle a speed range to maintain a right of way through a next upcoming light and subsequent lights on the predetermined path of travel and a status section that displays a status of the next upcoming light and subsequent upcoming lights along the predetermined path of travel.

2. The traffic broadcast system according to claim 1, wherein the traffic broadcast module connects to at least two intersection control modules.

3. The traffic broadcast system according to claim 2, wherein the traffic broadcast module further connects to the at least two intersection control modules.

4. The traffic broadcast system according to claim 1, wherein the electronic device capable of transmitting broadcast signals is a transceiver for a cellular network.

5. The traffic broadcast system according to claim 1, wherein the broadcast signals are transmitted on digital sub channels to transmit more than one independent data transmission at the same time on a common radio frequency channel.

6. The traffic broadcast system according to claim 5, wherein the broadcast signals are in FM HD format.

7. The traffic broadcast system according to claim 1, wherein the traffic receiver module comprises a vehicle receiver module for receiving broadcast signals and a vehicle positioning system for determining the vehicle's position and direction with respect to the broadcast area.

8. The traffic broadcast system according to claim 7, wherein the traffic receiver module further comprises a mobile device that receives and analyzes broadcast signals using the vehicle positioning system and sends analyzed traffic data which is relevant to the vehicle to the vehicle receiver module for further processing.

9. The traffic broadcast system according to claim 1, wherein the status section informs the user on how far the vehicle is from each upcoming light along the predetermined path of travel using distance or time measurements.

10. The traffic broadcast system according to claim 1, wherein the status section informs the user on how long it will take to reach each upcoming light based on current position and velocity.

11. The traffic broadcast system according to claim 1, wherein the display module lists traffic emergency warnings on the predetermined path of travel.

12. The traffic broadcast system according to claim 1, wherein the display module further includes a distance section displaying a distance until the next upcoming light.

13. The traffic broadcast system according to claim 1, wherein the key lists a range of vehicle speeds and indicating a vehicle speed that would prevent the vehicle from receiving a clear right of way through the next upcoming light.

14. A method for broadcasting traffic information to a vehicle, comprising the steps of:

collecting traffic data from aft a plurality of intersection control modules, the traffic data including upcoming traffic light schedules, traffic density, and traffic emergency issues along a predetermined path of travel;

converting the traffic data into broadcast signals;

transmitting the broadcast signals over a designated broadcast area;

receiving the broadcast signals by a mobile device;

determining vehicle position data and direction with respect to the designated broadcast area;

analyzing the broadcast signals for traffic data relevant to the vehicle with respect to current and immediate future traffic conditions and the vehicle position data, including light schedules and traffic obstacles;

sending the relevant traffic data to a display module and a vehicle control module; and displaying in a status section of the display module a status for an upcoming light schedule of a next upcoming light and subsequent upcoming lights along the predetermined path of travel.

15. The method for broadcasting traffic data according to claim 14, further comprising the step of:

processing and analyzing the broadcast signals including vehicle positioning and direction through the mobile device; and sending the traffic data to a vehicle processing unit in order to prepare data for the display module and/or the vehicle control module.

* * * * *